(12) United States Patent
Sumi

(10) Patent No.: US 11,316,414 B2
(45) Date of Patent: Apr. 26, 2022

(54) METHOD OF MANUFACTURING COIL AND METHOD OF MANUFACTURING MOTOR

(71) Applicant: Nidec Corporation, Kyoto (JP)

(72) Inventor: Shigeharu Sumi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/276,848

(22) PCT Filed: Jul. 5, 2019

(86) PCT No.: PCT/JP2019/026769
§ 371 (c)(1),
(2) Date: Mar. 17, 2021

(87) PCT Pub. No.: WO2020/066206
PCT Pub. Date: Apr. 2, 2020

(65) Prior Publication Data
US 2021/0376696 A1     Dec. 2, 2021

(30) Foreign Application Priority Data

Sep. 28, 2018 (JP) .............................. JP2018-184216

(51) Int. Cl.
| | |
|---|---|
| *H01F 7/06* | (2006.01) |
| *H02K 15/00* | (2006.01) |
| *B23P 19/02* | (2006.01) |
| *H02K 15/12* | (2006.01) |

(52) U.S. Cl.
CPC .......... *H02K 15/0031* (2013.01); *B23P 19/02* (2013.01); *H02K 15/12* (2013.01); *Y10T 29/49073* (2015.01)

(58) Field of Classification Search
CPC ............... Y10T 29/49; Y10T 29/49009; Y10T 29/49071; H02K 15/0031; H02K 15/066
USPC .......... 29/606, 596, 598, 604, 605, 732, 736
See application file for complete search history.

(56) References Cited

U.S. PATENT DOCUMENTS 7,928,626 B2 *  4/2011  Kamibayashi ......... H02K 1/165
                                                310/208
9,960,650 B2 *  5/2018  Tamura .............. H02K 15/0421

FOREIGN PATENT DOCUMENTS

JP         2004-180396 A      6/2004

* cited by examiner

*Primary Examiner* — Thiem D Phan
(74) *Attorney, Agent, or Firm* — Keating & Bennett

(57) ABSTRACT

A method of manufacturing a coil includes forming a wound body by winding a coil wire in multiple layers, and forming a coil by pressing the wound body using a die surrounding the wound body and compressively deforming the wound body. The wound body has a contour of a rectangular or substantially rectangular shape in cross section, and includes coil wire portions located in the cross section of the coil wire, the coil wire portions being aligned along each side of the rectangular or substantially rectangular shape. The coil has a contour of a fan shape or approximate fan shape in the cross section, where the coil wire portions are aligned in a direction along an arc and a radial direction of the fan shape or approximate fan shape.

7 Claims, 13 Drawing Sheets

METHOD OF MANUFACTURING COIL AND METHOD OF MANUFACTURING MOTOR

CROSS REFERENCE TO RELATED APPLICATIONS

This is a U.S. national stage of PCT Application No. PCT/JP2019/026769, filed on Jul. 5, 2019, and claims priority under U.S.C. § 119(a) and 35 U.S.C. § 365(b) from Japanese Patent Application No. 2018-184216, filed Sep. 28, 2018; the entire disclosures of each of which are hereby incorporated herein by reference.

FIELD OF THE INVENTION

The present invention relates to a method of manufacturing a coil and a method of manufacturing a motor.

BACKGROUND

A coil including windings each having a trapezoidal cross-sectional shape is known. In such a coil, the windings each having a trapezoidal shape may be aligned with their sides being aligned with each other, in order to increase a space factor by reducing a gap between the windings. In this case, since the coil has a cross-sectional contour of a fan shape, it is necessary to change cross-sectional shapes of the windings in accordance with positions where the windings are wound. There is known a method for preliminarily changing a cross-sectional shape of a wire, which is in a state before being wound, to a cross-sectional shape corresponding to a position where the wire is wound.

However, in the case of the above method, if the position where the wire is wound is shifted or a position where the cross-sectional shape of the wire is changed is shifted, cross-sectional shapes of windings each formed by winding the wire are non-uniform, and thus a gap is formed between the windings. Consequently, the space factor of the coil cannot be sufficiently increased in some cases.

SUMMARY

An example embodiment of a method of manufacturing a coil according to the present disclosure is a method of manufacturing a coil included in a motor, the method including forming a wound body by winding a coil wire in multiple layers around a winding core extending in one direction, and forming a coil by pressing the wound body using a die surrounding the wound body and compressively deforming the wound body. The wound body formed in the forming the wound body has a contour of a rectangular or substantially rectangular shape in a predetermined cross section that is parallel or substantially parallel with the one direction and passes a center line of the winding core, and includes a plurality of coil wire portions located in the predetermined cross section of the coil wire, the plurality of coil wire portions being aligned along each side of the rectangular or substantially rectangular shape. The coil has a contour of a fan shape or an approximately fan shape in the predetermined cross section, where the coil wire portions are aligned in a direction along an arc of the fan shape and a radial direction of the fan shape or approximately fan shape. In the forming the coil, the coil wire portions in the predetermined cross section are deformed such that cross-sectional shapes each become a trapezoidal or substantially trapezoidal shape. The forming the coil includes molding the contour of the wound body in the predetermined cross section into an intermediate shape between the rectangular or substantially rectangular shape and the fan shape or approximate fan shape, and molding the contour of the wound body in the predetermined cross section from the intermediate shape into the fan shape or approximate fan shape.

An example embodiment of a method of manufacturing a motor according to the present disclosure includes the method of manufacturing a coil.

The above and other elements, features, steps, characteristics and advantages of the present disclosure will become more apparent from the following detailed description of the example embodiments with reference to the attached drawings.

DETAILED DESCRIPTION

Figure 1:
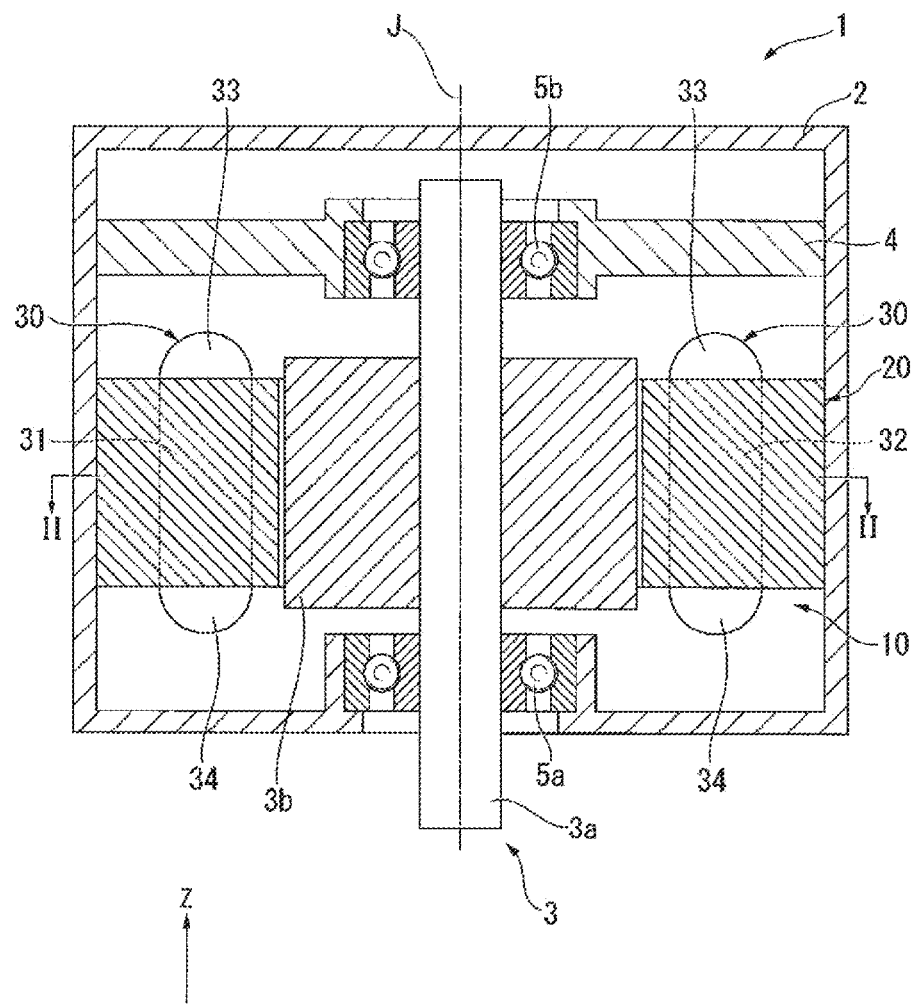
FIG. 1 is a cross-sectional view illustrating a motor of an example embodiment of the present disclosure.
Figure 2:
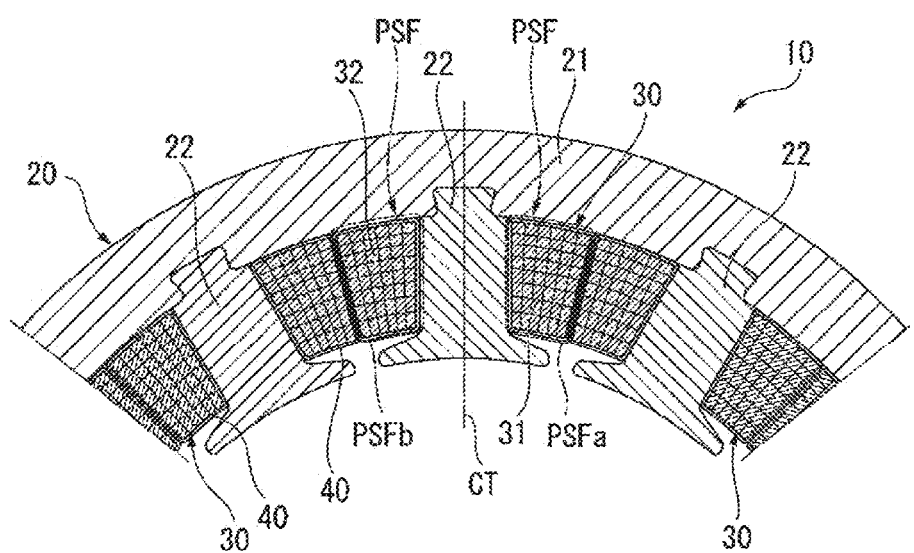
FIG. 2 is a cross-sectional view illustrating a portion of a stator of the present example embodiment and is a cross-sectional view taken along line II-II in FIG. 1.
Figure 3:
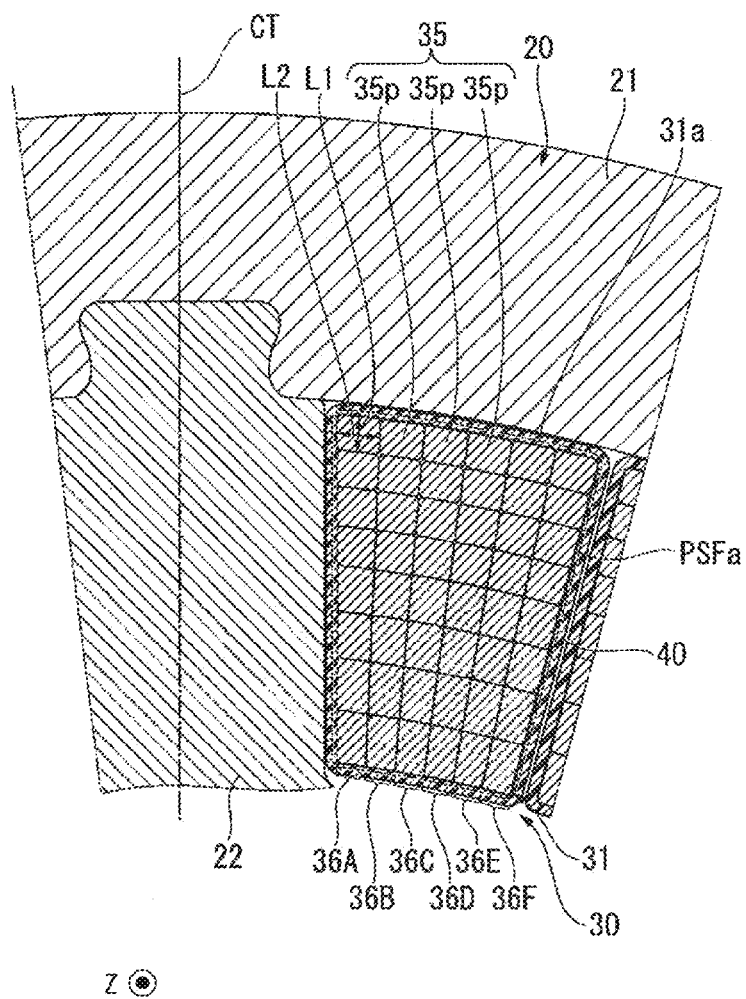
FIG. 3 is a cross-sectional view illustrating the portion of the stator of the present example embodiment and is a partially enlarged view of FIG. 2.

A Z-axis direction illustrated in FIGS. 1 to 3 is a direction parallel to a central axis J illustrated in FIG. 1. In the following description, an axial direction of the central axis J, that is, a direction parallel to the Z-axis direction is simply referred to by the term "axial direction", "axial", or "axially"; a radial direction centered on the central axis J is simply referred to by the term "radial direction", "radial", or "radially; and a circumferential direction about the central axis J is simply referred to by the term "circumferential direction", "circumferential", or "circumferentially". Furthermore, in the following description, one circumferential side refers to a side moving in a clockwise direction when viewed from a positive side in the Z-axis direction, and the other circumferential side refers to a side moving in a counterclockwise direction when viewed from the positive side in the Z-axis direction.

As illustrated in FIG. 1, a motor 1 of the present example embodiment is an inner rotor motor. The motor 1 includes a housing 2, a rotor 3, a stator 10, a bearing holder 4, and bearings 5a and 5b. The housing 2 houses the rotor 3, the stator 10, the bearing holder 4, and the bearings 5a and 5b. The rotor 3 radially faces the stator 10 with a gap defined therebetween. In the present example embodiment, the rotor 3 is located radially inside the stator 10. The rotor 3 includes a shaft 3a and a rotor body 3b.

The shaft 3a rotates about the central axis J. The shaft 3a has a cylindrical shape extending in the axial direction with the central axis J as a center. The shaft 3a is supported by the bearings 5a and 5b such that the shaft 3a is rotatable about the central axis J. The rotor body 3b is fixed to an outer peripheral surface of the shaft 3a. Although not illustrated, the rotor body 3b includes a rotor core fixed to the shaft 3a and a magnet fixed to the rotor core. The bearing holder 4 holds the bearing 5b.

As illustrated in FIGS. 2 and 3, the stator 10 includes a stator core 20, a plurality of coils 30, and insulators 40. The stator core 20 includes a core back 21 having a ring shape enclosing the central axis J, and a plurality of teeth 22 extending radially inward from the core back 21. For example, the core back 21 has an annular ring shape with the central axis J as a center. The plurality of teeth 22 are circumferentially spaced apart from one another. Although not illustrated, the plurality of teeth 22 are circumferentially disposed at equal intervals along a circumference of the core back 21. In the present example embodiment, the plurality of teeth 22 are provided as separate members from the core back 21. The plurality of teeth 22 are fixed to the core back 21 by, for example, press-fitting protrusions provided at radial outer ends of the teeth 22 into recesses provided on a radial inner surface of the core back 21. For example, the teeth 22 are twelve in number.

FIGS. 2 and 3 each illustrate a circumferential center line CT as a virtual line passing a circumferential center of each tooth 22. Furthermore, in the following description, a direction parallel to the circumferential center line CT, that is, an extending direction of the tooth 22, is simply referred to as an "extending direction". In the present example embodiment, both circumferential side surfaces of the tooth 22 are parallel to the axial direction and the extending direction.

As illustrated in FIG. 2, the plurality of coils 30 are mounted on the plurality of teeth 22 in a one-to-one manner. As illustrated in FIG. 3, each coil 30 is formed by winding a coil wire 35 around each tooth 22. In the present example embodiment, the coil wire 35 is an enameled wire having an enamel coating on its surface. Note that, the drawings do not illustrate the enamel coating. The coil 30 is formed by winding the coil wire 35 in multiple layers. In the present example embodiment, the coil 30 is formed by winding the coil wire 35 in three or more layers. For example, the coil 30 is formed by winding the coil wire 35 in six layers. That is, the coil 30 includes a first layer 36A, a second layer 36B, a third layer 36C, a fourth layer 36D, a fifth layer 36E, and a sixth layer 36F.

The first layer 36A is an innermost layer among the layers of the coil 30. The sixth layer 36F is an outermost layer among the layers of the coil 30. The second layer 36B, the third layer 36C, the fourth layer 36D, and the fifth layer 36E are sequentially and adjacently arranged from inside to outside between the first layer 36A and the sixth layer 36F.

As illustrated in FIGS. 1 and 2, the coil 30 includes a pair of axial extension portions 31 and 32 and a pair of circumferential extension portions 33 and 34. The axial extension portion 31 is a portion mounted on the tooth 22 on the one circumferential side. The axial extension portion 32 is a portion mounted on the tooth 22 on the other circumferential side. The pair of axial extension portions 31 and 32 extend in the axial direction. The pair of axial extension portions 31 and 32 sandwich the tooth 22 in the circumferential direction.

The pair of circumferential extension portions 33 and 34 are portions mounted on the tooth 22 on both axial sides. Although not illustrated, the circumferential extension portion 33 extends in the circumferential direction and connects one axial end of the axial extension portion 31 with one axial end of the axial extension portion 32. Although not illustrated, the circumferential extension portion 34 extends in the circumferential direction and connects the other axial end of the axial extension portion 31 with the other axial end of the axial extension portion 32.

As illustrated in FIG. 2, in a cross section perpendicular to the axial direction, the axial extension portion has a contour of a fan shape PSFa. In the cross section perpendicular to the axial direction, the axial extension portion 32 has a contour of a fan shape PSFb. The contours of the axial extension portions 31 and 32 in the cross section perpendicular to the axial direction correspond to a cross-sectional shape of the coil 30 in the cross section perpendicular to the axial direction. That is, in the cross section perpendicular to the axial direction, the coil 30 has contours of the fan shapes PSFa and PSFb. The fan shapes PSFa and PSFb are shapes of line-symmetry with respect to the circumferential center line CT when viewed in the axial direction.

The "fan shape" as used herein includes a shape enclosed by two arcs and two line segments, the two arcs having the same center of curvature but different radii, the two line segments extending in the radial direction of a circle centered on the center of curvature and connecting both ends of the two arcs to each other. Furthermore, the "fan shape" as used herein includes a geometrically strict fan shape and a substantially fan shape. The "substantially fan shape" as used herein includes a shape in which the arcs of the fan shape are approximated by a plurality of line segments.

In the present example embodiment, the fan shapes PSFa and PSFb are each the shape enclosed by the two arcs and the two line segments. The fan shapes PSFa and PSFb each have a circumferential dimension that becomes smaller toward radially inside. Although not illustrated, the center of curvature of the fan shapes PSFa and PSFb is, for example, located radially inside the core back 21 and at a position different from the central axis J. Note that in the following description, the fan shapes PSFa and PSFb are simply referred to as a fan shape PSF, if no particular distinction is necessary.

The axial extension portion 31 and the axial extension portion 32 have shapes of line-symmetry with respect to the circumferential center line CT when viewed in the axial direction. The axial extension portion 32 has the same configuration as that of the axial extension portion 31 except that the axial extension portion 32 is line-symmetrically disposed. Thus, in the following description, only the axial extension portion 31 may be described as a representative of the axial extension portion 31 and the axial extension portion 32.

As illustrated in FIG. 3, the axial extension portion 31 includes a bundle of a plurality of coil wire portions 35p. The coil wire portions 35p are portions constituting the axial extension portion 31 in the coil wire 35 constituting the coil 30. The coil wire portions 35p extend in the axial direction. In the cross section perpendicular to the axial direction, the plurality of coil wire portions 35p are aligned in a direction along each arc of the fan shape PSFa and a radial direction of the fan shape PSFa. The first layer 36A to the sixth layer 36F each include the plurality of coil wire portions 35p arranged in the radial direction of the fan shape PSFa.

In the following description, the radial direction of the fan shape PSF may be simply referred to as the "radial direction". The radial direction includes a substantially radial direction. In addition, the direction along the arc of the fan shape PSF may be referred to by the term "arc direction" or "arc directional". The arc direction is a substantially circumferential direction.

The coil wire portions 35p each have a trapezoidal cross-sectional shape whose arc directional dimension becomes smaller toward radially inside. The "trapezoidal shape" as used herein includes a geometrically strict trapezoidal shape and a substantially trapezoidal shape. The "substantially trapezoidal shape" as used herein includes a chamfered trapezoidal shape. In addition, the "substantially trapezoidal shape" as used herein also includes a trapezoidal shape having curved sides. In the present example embodiment, the coil wire portions 35p each have a cross-sectional shape, for example, having chamfered corners and both radial sides slightly curved in the arc direction.

The coil wire portions 35p each have a radial dimension L1 that becomes larger as the coil wire portion 35p is located radially more inside. The coil wire portions 35p each have an arc directional dimension L2 that becomes smaller as the coil wire portion 35p is located radially more inside. The plurality of coil wire portions 35p have the same cross-sectional areas. The coil wire portions 35p adjacent in the radial direction are in contact with each other on their radial side surfaces. The coil wire portions 35p adjacent in the arc direction are in contact with each other on their arc directional side surfaces.

The plurality of coil wire portions 35p constituting the first layer 36A are adjacent to the tooth 22 on the one circumferential side. The other-circumferential-side side surfaces of the plurality of coil wire portions 35p constituting the first layer 36A are in direct or indirect contact with the one-circumferential-side side surface of the tooth 22. Thus, heat of the coil 30 is easily released to the tooth 22. In the present example embodiment, the other-circumferential-side side surfaces of the plurality of coil wire portions 35p constituting the first layer 36A are in indirect contact with the one-circumferential-side surface of the tooth 22 with the insulator 40 interposed therebetween.

Among the plurality of coil wire portions 35p constituting each layer, the coil wire portions 35p located on a radially outermost side are in direct or indirect contact with an inner peripheral surface of the core back 21. Thus, the heat of the coil 30 is easily released to the core back 21. In the present example embodiment, among the plurality of coil wire portions 35p constituting each layer, the coil wire portions 35p located on the radially outermost side are in indirect contact with the inner peripheral surface of the core back 21 with the insulator 40 interposed therebetween.

The insulator 40 is a sheet-shaped insulating member. The insulator 40 may be an insulating tape or an insulating sheet of paper. As illustrated in FIG. 2, in the present example embodiment, the insulator 40 is provided for each of the axial extension portions 31 and 32. The insulators 40 are wound around the axial extension portions 31 and 32. The insulator 40 provided in the axial extension portion 31 surrounds the axial extension portion 31 in the cross section perpendicular to the axial direction. The insulator 40 provided in the axial extension portion 32 surrounds the axial extension portion 32 in the cross section perpendicular to the axial direction. Although not illustrated, each of the insulators 40 is provided over substantially the entire axial length of the axial extension portions 31 and 32.

The provision of the insulator 40 achieves an improved insulation between the coil 30 and the stator core 20. Furthermore, since the insulator 40 has a thin sheet shape, the insulator 40 causes less disturbance in the heat transfer from the coil 30 to the core back 21 and the tooth 22. Thus, it is possible to reduce a decrease in heat dissipation of the coil 30 while ensuring suitable insulation.

Figure 4:
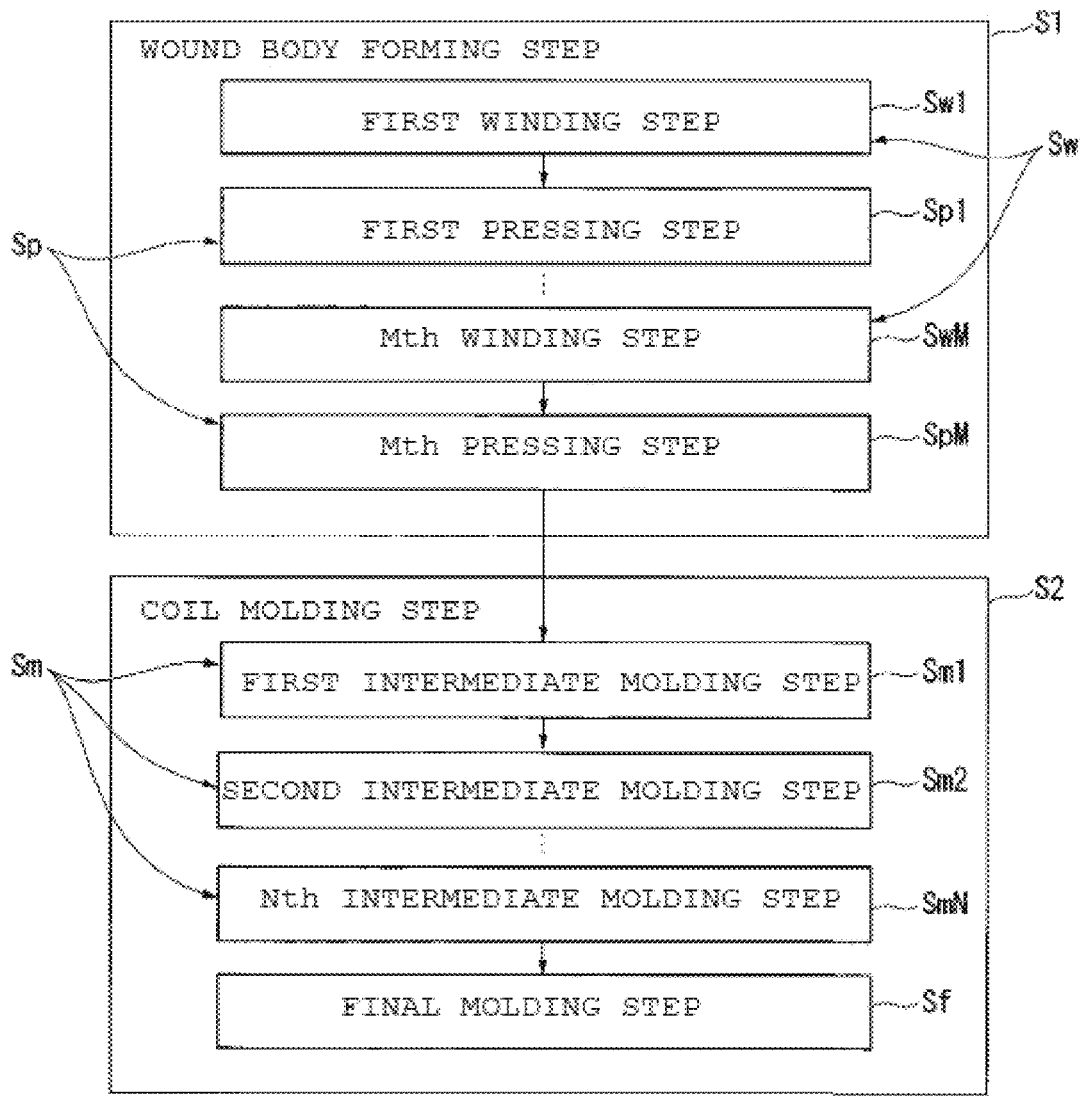
FIG. 4 is a flowchart illustrating a procedure for manufacturing a coil of the present example embodiment.

A method of manufacturing the motor 1 includes a method of manufacturing the coil 30. As illustrated in FIG. 4, the method of manufacturing the coil 30 includes a wound body forming step S1 and a coil molding step S2. As illustrated in FIGS. 5 to 9, the wound body forming step S1 is a step of forming a wound body 130 by winding a coil wire 135 in multiple layers around a winding core Wm extending in one direction. The coil wire 135 is a coil wire having a circular cross-sectional shape.

In FIGS. 5 to 13, the one direction in which the winding core Wm extends is illustrated as a Za-axis direction. In addition, in the following description, the Za-axis direction, that is, the one direction is referred to as an "up-down direction", a positive side and a negative side in the Za-axis direction are referred to as an "upper side" and a "lower side", respectively. Furthermore, FIGS. 5 to 13 each illustrate an Xa-axis direction and a Ya-axis direction, which are perpendicular to the Za-axis direction. The Xa-axis direction is perpendicular to the Ya-axis direction. The Xa-axis direction corresponds to a left-right direction in FIGS. 5 to 13. In the following description, the Xa-axis direction is referred to by the term "width direction" or "widthwise", and the Ya-axis direction is referred to by the term "depth direction" or "depthwise". The depth direction corresponds to the axial direction in which the central axis J extends when the coil 30 is installed in the motor 1.

Note that, the terms "up-down direction", "upper side", and "lower side" are terms used merely for description of arrangement relationships and the like of components. Actual arrangement relationships and the like may be arrangement relationships and the like other than the arrangement relationships indicated by these terms.

Figure 5:
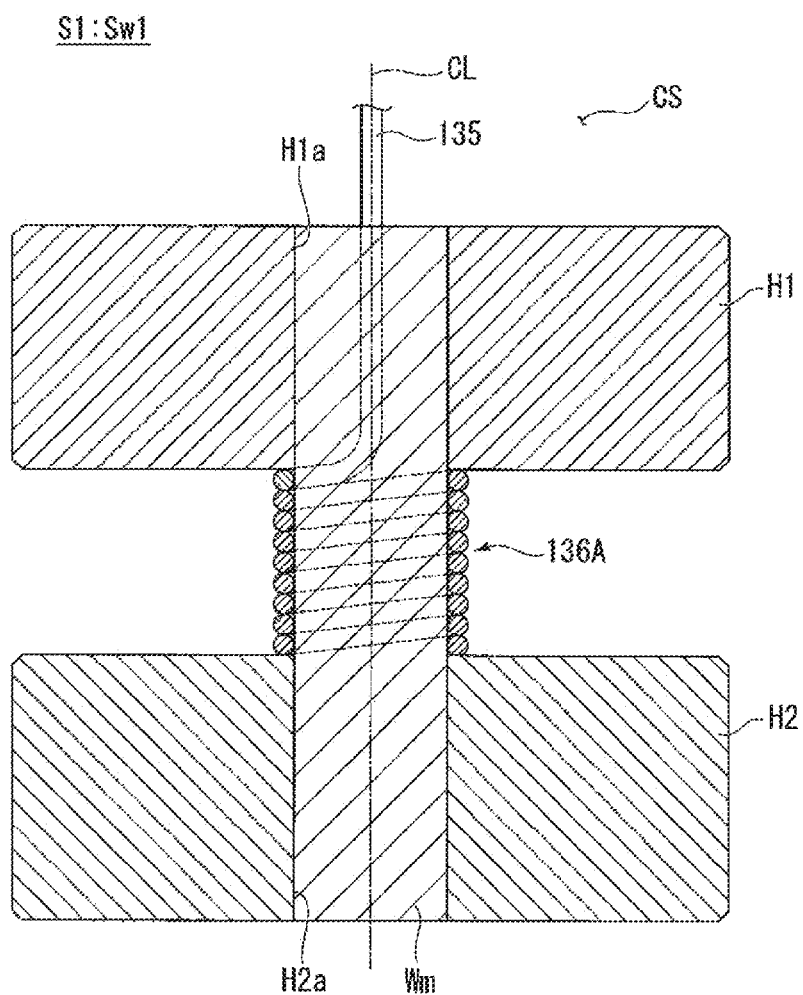
FIG. 5 is a cross-sectional view illustrating a procedure of a first winding step of the present example embodiment.

As illustrated in FIG. 5, the winding core Wm extends in the up-down direction with a center line CL as a center. The winding core Wm has, for example, a rectangular parallelepiped shape that is long in the up-down direction. A widthwise dimension of the winding core Wm is smaller than a depthwise dimension of the winding core Wm.

Note that, FIGS. 5 to 13 each illustrate a predetermined cross section CS that is parallel with the up-down direction and passes the center line CL of the winding core Wm. The predetermined cross section CS is perpendicular to the depth direction. In the present example embodiment, the predetermined cross section CS corresponds to the cross section perpendicular to the axial direction illustrated in FIGS. 2 and 3 when the coil 30 is installed in the motor 1.

As illustrated in FIG. 4, the wound body forming step S1 includes a plurality of winding steps Sw and a plurality of pressing steps Sp. In the wound body forming step S1, a worker and the like form the wound body 130 by alternately performing the winding step Sw and the pressing step Sp. The winding step Sw is a step of winding the coil wire 135 having the circular cross-sectional shape in a single layer around the winding core Wm. The pressing step Sp is a step of pressing the coil wire 135, which has been wound in the single layer in the winding step Sw, in a direction of pressing the coil wire 135 against the winding core Wm; and changing the cross-sectional shape of the coil wire 135, which has been wound in the single layer, in the predetermined cross section CS to a rectangular shape that is long in the up-down direction.

Note that, the "worker and the like" as used herein include a worker, an assembling apparatus, and the like that perform each work in each manufacturing step. Each work may be performed by the worker alone, the assembling apparatus alone, or the worker and the assembling apparatus.

The winding step Sw includes a first winding step Sw1 to an Mth winding step SwM. The pressing step Sp includes a first pressing step Sp1 to an Mth pressing step SpM. M corresponds to the number of times the winding step Sw is performed and the number of times the pressing step Sp is performed. In the present example embodiment, since the coil 30 is formed by winding the coil wire 35 in six layers, M is 6. That is, the winding step Sw includes six winding steps Sw from the first winding step Sw1 to a sixth winding step, and the pressing step Sp includes six pressing steps Sp from the first pressing step Sp1 to a sixth pressing step.

As illustrated in FIG. 5, the first winding step Sw1 is a step of winding the coil wire 135 around the winding core Wm held by winding core holders H1 and H2 to form a first layer 136A. The first layer 136A is a portion that constitutes the first layer 36A in the coil 30. The winding core holder H1 and the winding core holder H2 are spaced apart from each other in the up-down direction. The winding core holder H1 has a through hole H1a that penetrates the winding core holder H1 in the up-down direction. The through hole H1a allows an upper end of the winding core Wm to be fitted and fixed thereto. The winding core holder H2 is located below the winding core holder H1. The winding core holder H2 has a through hole H2a that penetrates the winding core holder H2 in the up-down direction. The through hole H2a allows a lower end of the winding core Wm to be fitted and fixed thereto.

In the first winding step Sw1, the worker and the like sequentially wind the coil wire 135 in the up-down direction around a portion of the winding core Wm, the portion being located between the winding core holder H1 and the winding core holder H2 in the up-down direction. Thus, the worker and the like form the first layer 136A.

Figure 6:
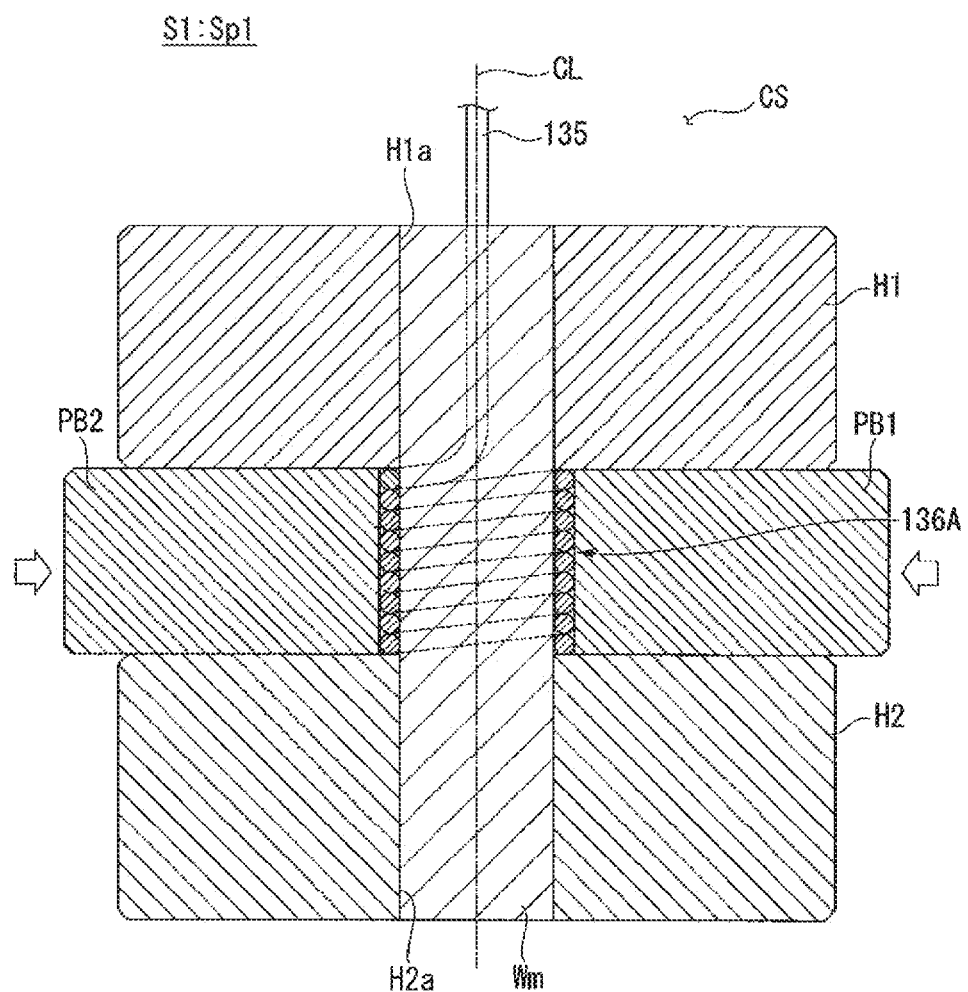
FIG. 6 is a cross-sectional view illustrating a procedure of a first pressing step of the present example embodiment.
Figure 7:
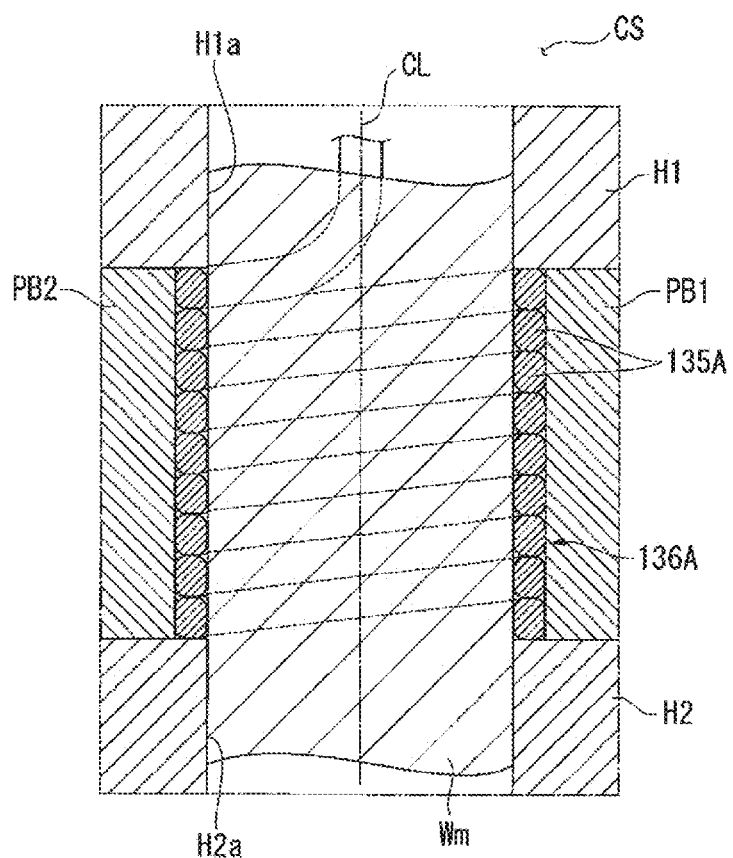
FIG. 7 is a cross-sectional view illustrating the procedure of the first pressing step of the present example embodiment.

As illustrated in FIG. 6, in the first pressing step Sp1, the worker and the like press the first layer 136A by inserting press blocks PB1 and PB2, from both widthwise sides, between the winding core holder H1 and the winding core holder H2 in the up-down direction. The worker and the like press the first layer 136A against the winding core Wm using the press blocks PB1 and PB2, and crush the first layer 136A in the width direction. As a result of this, as illustrated in FIG. 7, the first layer 136A includes a plurality of coil wire portions 135A each having a rectangular cross-sectional shape that is long in the up-down direction.

Note that, the "rectangular shape" as used herein includes a geometrically strict rectangular shape and a substantially rectangular shape. The "substantially rectangular shape" as used herein includes a chamfered rectangular shape. The cross-sectional shapes of the coil wire portions 135A pressed in the first pressing step Sp1 are each a round chamfered rectangular shape.

Figure 8:
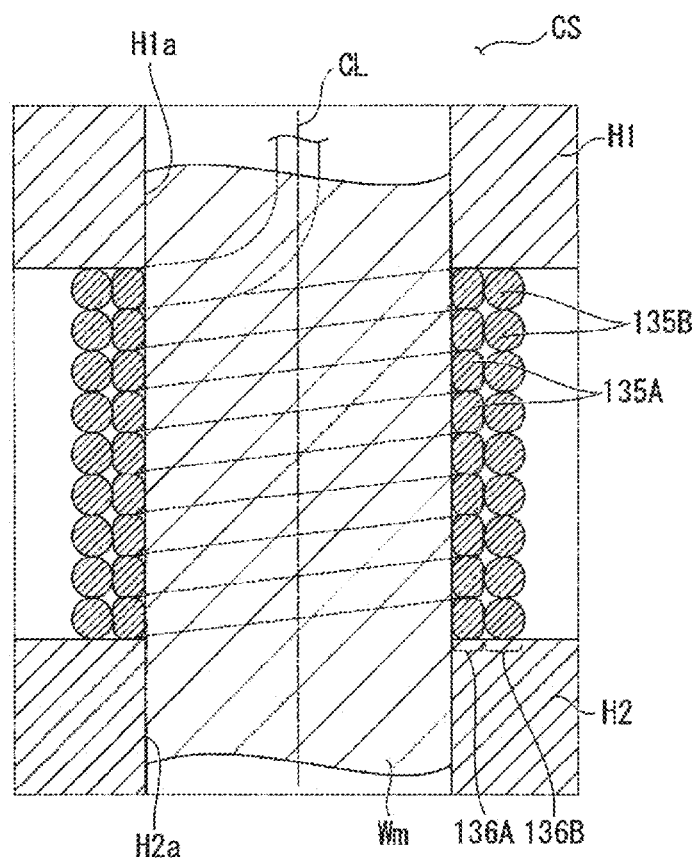
FIG. 8 is a cross-sectional view illustrating a procedure of a second winding step of the present example embodiment.

As illustrated in FIG. 8, a second winding step Sw2 is a step of winding the coil wire 135 around an outside of the first layer 136A to form a second layer 136B, the first layer 136A including the coil wire portions 135A each having the rectangular cross-sectional shape. The second layer 136B is a portion that constitutes the second layer 36B in the coil 30. The coil wire 135 to be wound in the second winding step Sw2 has a circular cross-sectional shape. That is, the second layer 136B formed through the second winding step Sw2 includes the plurality of coil wire portions 135B each having a circular cross-sectional shape. The second winding step Sw2 is followed by a second pressing step. In the second pressing step, the cross-sectional shape of the coil wire 135 constituting the second layer 136B, that is, of each of the plurality of coil wire portions 135B in the predetermined cross section CS is changed to a rectangular shape that is long in the up-down direction similarly to the first layer 136A.

Figure 9:
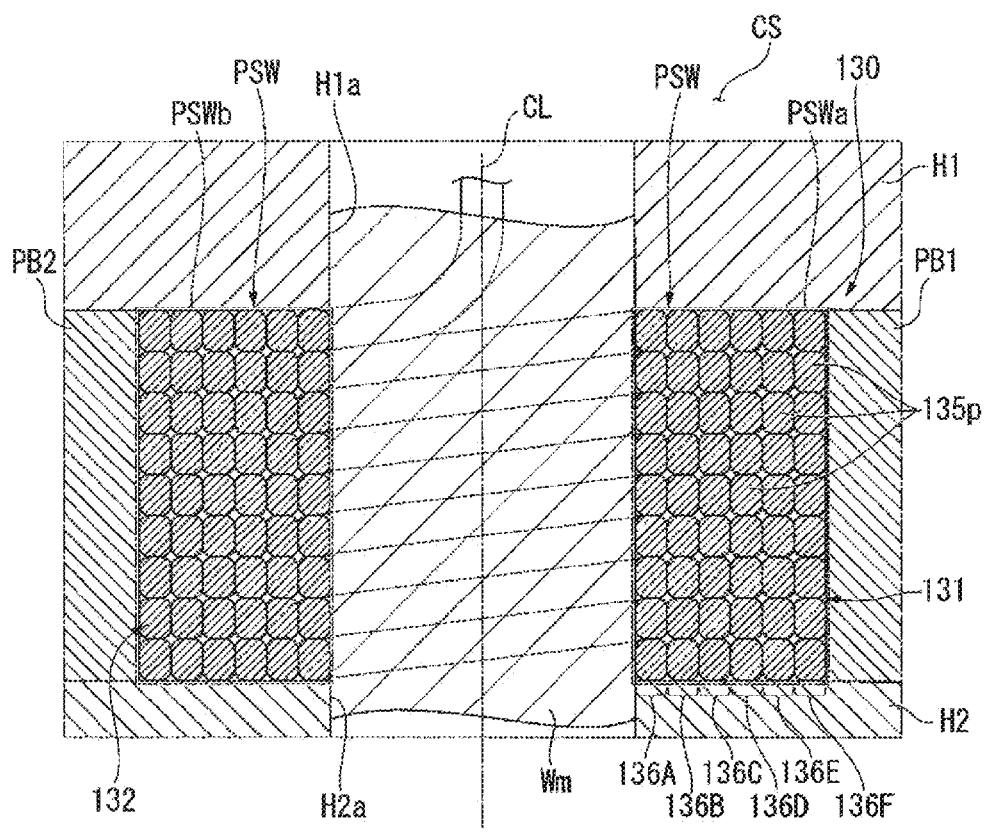
FIG. 9 is a cross-sectional view illustrating a procedure of an Mth pressing step of the present example embodiment.

Hereinafter, in the same manner, the winding step Sw and the pressing step Sp are alternately repeated, so that the wound body 130 as illustrated in FIG. 9 is formed. In the present example embodiment, the wound body 130 is formed by winding the coil wire 135 in six layers. That is, the wound body 130 includes a first layer 136A, a second layer 136B, a third layer 136C, a fourth layer 136D, a fifth layer 136E, and a sixth layer 136F. The third layer 136C is a portion that constitutes the third layer 36C in the coil 30. The fourth layer 136D is a portion that constitutes the fourth layer 36D in the coil 30. The fifth layer 136E is a portion that constitutes the fifth layer 36E in the coil 30. The sixth layer 136F is a portion that constitutes the sixth layer 36F in the coil 30.

The wound body 130 includes extension portions 131 and 132 extending in the depth direction on both widthwise sides of the winding core Wm. The extension portion 131 is a portion that constitutes the axial extension portion 31 in the coil 30. The extension portion 132 is a portion that constitutes the axial extension portion 32 in the coil 30. The wound body 130 formed in the wound body forming step S1 has contours of rectangular shapes PSW in the predetermined cross section CS. The contours of the wound body 130 in the predetermined cross section CS include a contour of the extension portion 131 in the predetermined cross section CS and a contour of the extension portion 132 in the predetermined cross section CS. The contour of the extension portion 131 in the predetermined cross section CS is a rectangular shape PSWa. The contour of the extension portion 132 in the predetermined cross section CS is a rectangular shape PSWb. In the present example embodiment, the rectangular shape PSWa and the rectangular shape PSWb are each a rectangular shape that is long in the up-down direction and are the same in shape. Note that in the following description, the rectangular shapes PSWa and PSWb are simply referred to as the rectangular shape PSW, if no particular distinction is necessary.

The wound body 130 formed in the wound body forming step S1 includes a plurality of coil wire portions 135p located in the predetermined cross section CS in the coil wire 135, the plurality of coil wire portions 135p being aligned along each side of the rectangular shape PSW. In the present example embodiment, the plurality of coil wire portions 135p are aligned in the width direction and the up-down direction. The coil wire portions 135p adjacent in the width direction are in contact with each other. The coil wire portions 135p adjacent in the up-down direction are in contact with each other. In the predetermined cross section CS, the coil wire portions 135p have the same cross-sectional shapes and each have a rectangular shape that is long in the up-down direction.

Figure 10:
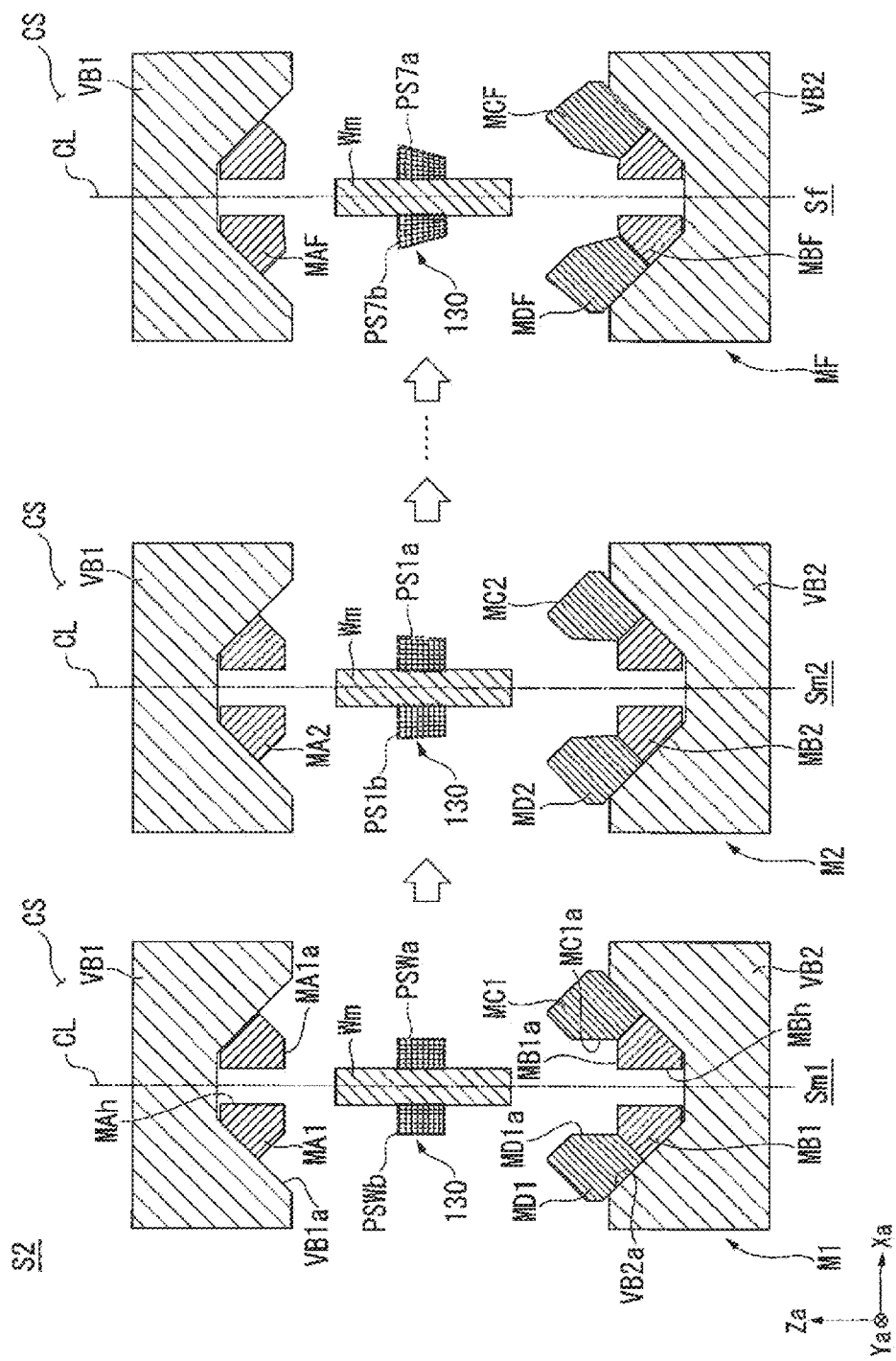
FIG. 10 is a cross-sectional view illustrating a procedure of a coil molding step of the present example embodiment.
Figure 11:
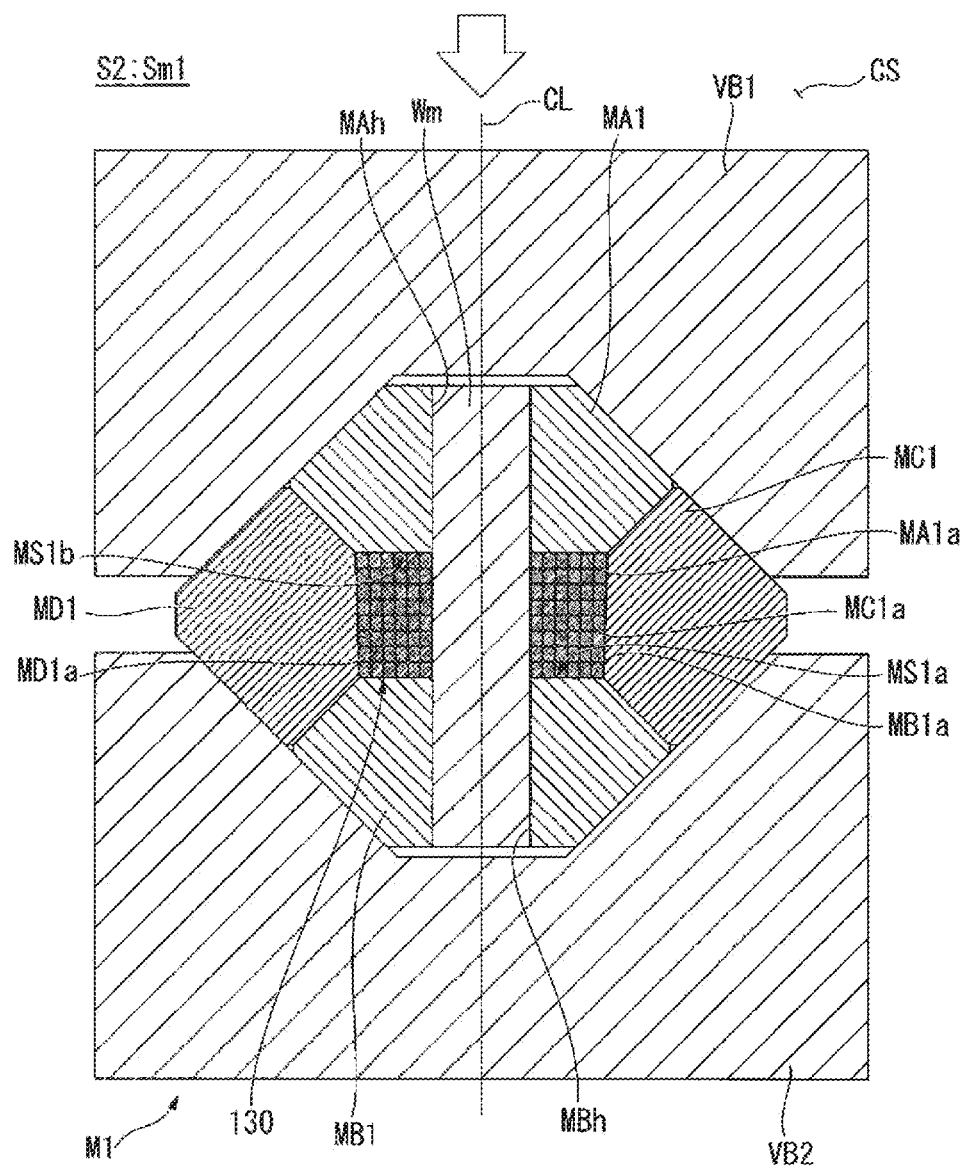
FIG. 11 is a cross-sectional view illustrating a procedure of a first intermediate molding step of the present example embodiment.
Figure 12:
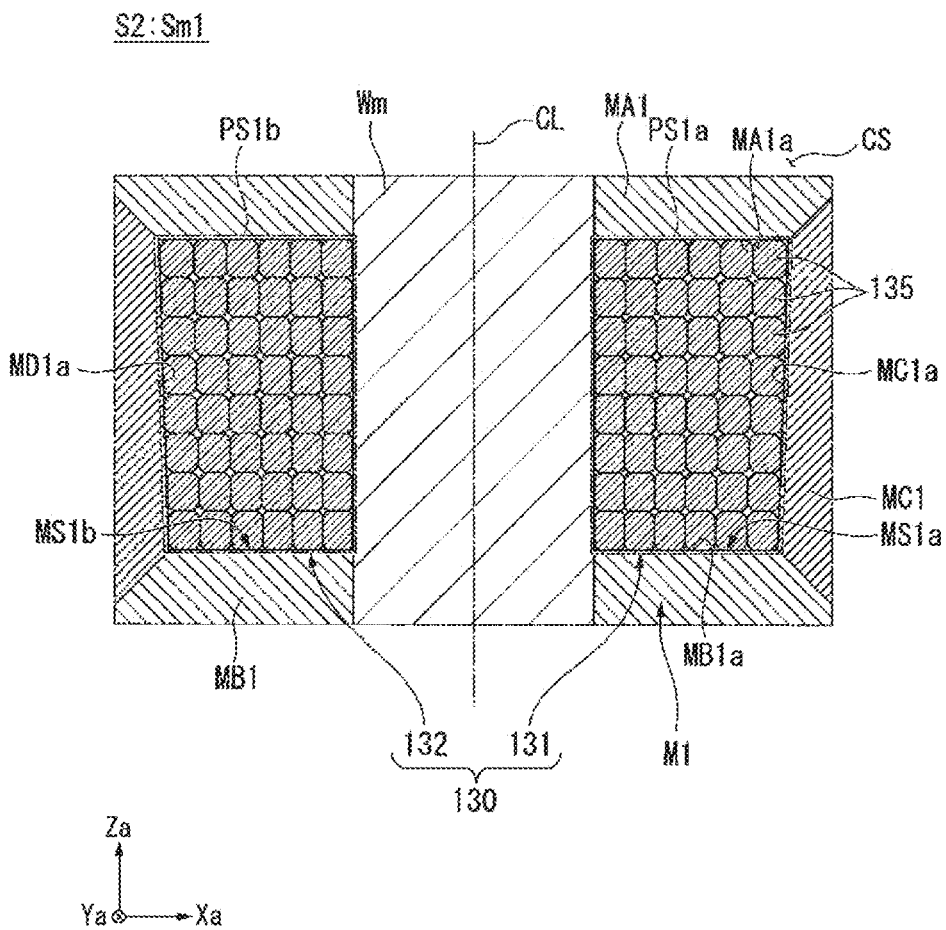
FIG. 12 is a cross-sectional view illustrating the procedure of the first intermediate molding step of the present example embodiment and is a partially enlarged view of FIG. 11.

As illustrated in FIGS. 10 to 12, the coil molding step S2 is a step of forming the coil 30 by pressing the wound body 130 using a die surrounding the wound body 130 and compressively deforming the wound body 130. As illustrated in FIG. 4, the coil molding step S2 includes a plurality of intermediate molding steps Sm and a final molding step Sf. The intermediate molding steps Sm are each a step of molding each contour of the wound body 130 in the predetermined cross section CS into an intermediate shape between the rectangular shape PSW and the fan shape PSF. The final molding step Sf is a step of molding each contour of the wound body 130 in the predetermined cross section CS from the intermediate shape between the rectangular shape PSW and the fan shape PSF into the fan shape PSF.

Figure 13:
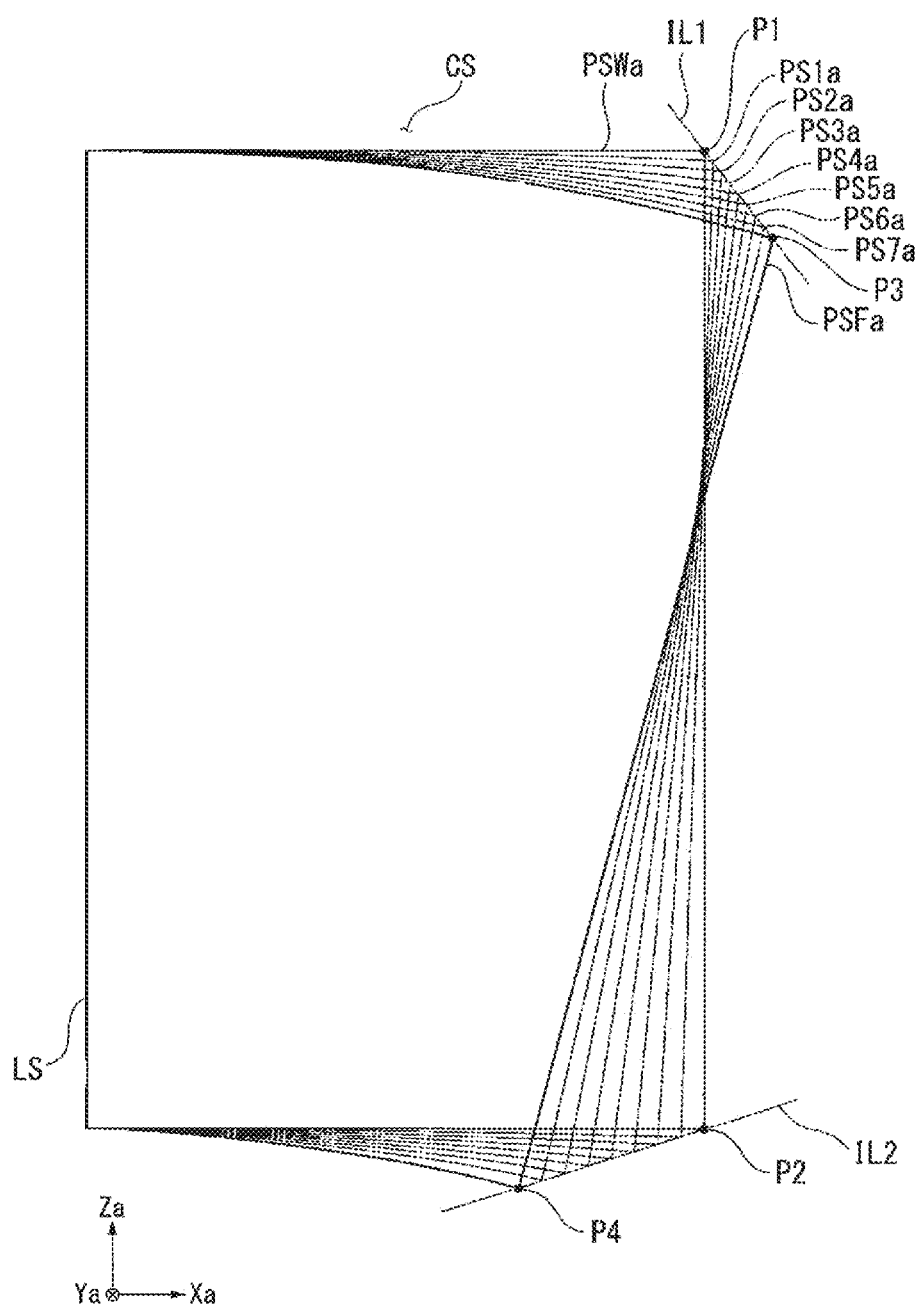
FIG. 13 is a view illustrating an intermediate shape of the present example embodiment.

As illustrated in FIG. 13, in the present example embodiment, the intermediate shape between the rectangular shape PSWa and the fan shape PSFa is a fan shape formed as follows. For example, in the predetermined cross section CS, in a state where one side on one widthwise side (−Xa side) of the rectangular shape PSWa is superposed on one side on the one widthwise side (−Xa side) of the fan shape PSFa, the fan shape is formed by connecting one side LS on the one widthwise side in the state of superposition, any point on a virtual line IL1, and any point on a virtual line IL2.

In the predetermined cross section CS, the virtual line IL1 is a line passing an upper corner portion P1 on the other widthwise side (+Xa side) of the rectangular shape PSWa and an upper corner portion P3 on the other widthwise side (+Xa side) of the fan shape PSFa. In the predetermined cross section CS, the virtual line IL2 is a line passing a lower corner portion P2 on the other widthwise side (+Xa side) of the rectangular shape PSWa and a lower corner portion P4 on the other widthwise side (+Xa side) of the fan shape PSFa.

In the present example embodiment, the intermediate shape between the rectangular shape PSWa and the fan shape PSFa includes, for example, seven intermediate shapes PS1$a$ to PS7$a$. Each of the intermediate shapes PS1$a$ to PS7$a$ is a fan shape formed by connecting the one side LS, a corresponding one of seven points that divide the portion between the upper corner portion P1 and the upper corner portion P3 on the virtual line IL1 into eight equal parts, and a corresponding one of seven points that divide the portion between the lower corner portion P2 and the lower corner portion P4 on the virtual line IL2 into eight equal parts. The intermediate shape PS1$a$, the intermediate shape PS2$a$, the intermediate shape PS3$a$, the intermediate shape PS4$a$, the intermediate shape PS5$a$, the intermediate shape PS6$a$, and the intermediate shape PS7$a$ become similar to the fan shape PSFa in this order.

The intermediate shapes PS1$a$ to PS7$a$ each have an area that is smaller than that of the rectangular shape PSWa and larger than that of the fan shape PSFa. The areas of the intermediate shape PS1$a$, the intermediate shape PS2$a$, the intermediate shape PS3$a$, the intermediate shape PS4$a$, the intermediate shape PS5$a$, the intermediate shape PS6$a$, and the intermediate shape PS7$a$ become smaller in this order.

The intermediate shape between the rectangular shape PSWb and the fan shape PSFb includes, for example, seven intermediate shapes PS1$b$ to PS7$b$. The intermediate shapes PS1$b$ to PS7$b$ are linearly symmetrical with the intermediate shapes PS1$a$ to PS7$a$, respectively, across the center line CL in the width direction. Note that, some of the intermediate shapes PS1$b$ to PS7$b$ are not illustrated.

The intermediate molding steps Sm include a first intermediate molding step Sm1 to the Nth intermediate molding step SmN. N corresponds to the number of times the intermediate molding steps Sm are performed. In the present example embodiment, since the intermediate shape between the rectangular shape PSW and the fan shape PSF includes, for example, the seven intermediate shapes PS1$a$ to PS7$a$, N is 7. That is, the intermediate molding steps Sm include seven intermediate molding steps Sm from the first intermediate molding step Sm1 to the seventh intermediate molding step.

As illustrated in FIG. 10, the plurality of intermediate molding steps Sm and the final molding step Sf performed in the present example embodiment include sequentially pressing the wound body 130 using a plurality of dies M1 to MF arranged in the width direction. The worker and the like move the wound body 130 in the width direction and perform work in each step sequentially using the dies M1 to MF.

As illustrated in FIGS. 10 and 11, in the first intermediate molding step Sm1, the worker and the like detach the winding core Wm having the molded wound body 130 from the winding core holders H1 and H2, and press the wound body 130 using the die M1.

The die M1 includes support blocks VB1 and VB2 and die bodies MA1, MB1, MC1, and MD1. The support block VB1 is located above the support block VB2. The support block VB1 has a lower surface provided with a recess VB1$a$ depressed upward. The die body MA1 is disposed in the recess VB1$a$. The support block VB2 has an upper surface provided with a recess VB2$a$ depressed downward. The die bodies MB1, MC1, and MD1 are disposed in the recess VB2$a$.

The die body MA1 has a through hole MAh that penetrates the die body MA1 in the up-down direction. As illustrated in FIG. 11, the through hole MAh allows the upper end of the winding core Wm to be inserted thereinto. The die body MA1 is located above the wound body 130 when the wound body 130 is pressed. The die body MA1 has a lower surface that serves as a pressing surface MA1$a$ that comes into contact with an upper surface of the wound body 130 and presses the wound body 130 downward.

The die body MB1 has a through hole MBh that penetrates the die body MB1 in the up-down direction. The through hole MBh allows the lower end of the winding core Wm to be inserted thereinto. The die body MB1 is located below the wound body 130 when the wound body 130 is pressed. The die body MB1 has an upper surface that serves as a pressing surface MB1$a$ that comes into contact with a lower surface of the wound body 130 and presses the wound body 130 upward.

The die body MC1 and the die body MD1 are located on both widthwise sides of the wound body 130 when the wound body 130 is pressed. Out of the widthwise side surfaces of the die body MC1, the widthwise side surface facing the wound body 130 serves as a pressing surface MC1$a$ that comes into contact with the widthwise side surface of the wound body 130 and presses the wound body 130 in a direction of pressing the wound body 130 against the winding core Wm. The pressing surface MC1$a$ presses the extension portion 131. Out of the widthwise side surfaces of the die body MD1, the widthwise side surface facing the wound body 130 serves as a pressing surface MD1$a$ that comes into contact with the widthwise side surface of the wound body 130 and presses the wound body 130 in a direction of pressing the wound body 130 against the winding core Wm. The pressing surface MD1$a$ presses the extension portion 132.

As illustrated in FIG. 10, in the first intermediate molding step Sm1, the worker and the like dispose the winding core Wm and the wound body 130 between the support block VB1 and the support block VB2 in the up-down direction. As illustrated in FIG. 11, the worker and the like move the support block VB1 downward and press the support block VB1 against the support block VB2 from above. Thus, the wound body 130 is surrounded and pressed by the pressing surfaces MA1a, MB1a, MC1a, and MD1a.

As illustrated in FIG. 12, in the predetermined cross section CS, the shape MS1a surrounded by the pressing surface MA1a, the pressing surface MB1a, the pressing surface MC1a, and the surface on one widthwise side (+Xa side) of the winding core Wm is the same as an intermediate shape PS1a. Therefore, by pressing the wound body 130 by the pressing surface MA1a, the pressing surface MB1a, and the pressing surface MC1a, the contour of the extension portion 131 in the predetermined cross section CS is molded into the intermediate shape PS1a.

Furthermore, in the predetermined cross section CS, a shape MS1b surrounded by the pressing surface MA1a, the pressing surface MB1a, the pressing surface MD1a, and the surface on the other widthwise side (−Xa side) of the winding core Wm is the same as the intermediate shape PS1b. Therefore, by pressing the wound body 130 by the pressing surface MA1a, the pressing surface MB1a, and the pressing surface MD1a, the contour of the extension portion 132 in the predetermined cross section CS is molded into the intermediate shape PS1b. Thus, the contours of the wound body 130 in the predetermined cross section CS are molded into the intermediate shapes PS1a and PS1b.

As illustrated in FIG. 10, in the second intermediate molding step Sm2, the worker and the like press, using the die M2, the wound body 130 subjected to the press working using the die M1. In the die M2, the die bodies MA2, MB2, MC2, and MD2 have pressing surfaces capable of forming shapes similar to the intermediate shapes PS2a and PS2b together with the winding core Wm. Thus, in the wound body 130 subjected to the press working using the die M2, the contours of the wound body 130 in the predetermined cross section CS are molded into the intermediate shapes PS2a and PS2b.

Hereinafter, in the same manner, the worker and the like perform the third intermediate molding step to the seventh intermediate molding step, respectively using dies having pressing surfaces capable of forming shapes similar to the intermediate shapes PS3a and PS3b, PS4a and PS4b, PS5a and PS5b, PS6a and PS6b, and PS7a and PS7b together with the winding core Wm. Thus, the wound body 130, whose contours in the predetermined cross section CS are molded into the intermediate shapes PS7a and PS7b, can be obtained. Each contour of the wound body 130 in the predetermined cross section CS becomes similar to the fan shape PSF each time each intermediate molding step Sm is performed. Furthermore, the area of the contour of the wound body 130 in the predetermined cross section CS becomes smaller each time each intermediate molding step Sm is performed.

In the final molding step Sf, the worker and the like press, using the die MF, the wound body 130 having the contours of the intermediate shapes PS7a and PS7b. In the die MF, the die bodies MAF, MBF, MCF, and MDF have pressing surfaces capable of forming a shape similar to the fan shape PSF together with the winding core Wm. Thus, the wound body 130 subjected to the press working using the die MF is molded into the coil 30 having a contour of the fan shape PSF in the predetermined cross section CS.

By performing the plurality of intermediate molding steps Sm and the final molding step Sf, in the predetermined cross section CS, the cross-sectional shapes of the coil wire portions 135p of the wound body 130 change from the rectangular shape to the trapezoidal shape, and the coil wire portions 135p of the wound body 130 become the coil wire portions 35p of the coil 30. That is, in the coil molding step S2, the worker and the like change the cross-sectional shapes of the coil wire portions 135p of the wound body 130 in the predetermined cross section CS such that each cross-sectional shape becomes a trapezoidal shape.

Through the above steps, each coil 30 is manufactured. The worker and the like detach the coil 30 thus manufactured from the winding core Wm, and wind the insulators 40 around the axial extension portions 31 and 32. The worker and the like mount the coil 30 around which the insulators 40 are wound on the tooth 22 separated from the core back 21. The worker and the like fix the tooth 22 having the coil 30 mounted thereon to the core back 21. In this manner, the stator 10 is manufactured. The worker and the like fix the stator 10 to an inside of the housing 2. The worker and the like insert the rotor 3 into the housing 2 and dispose the rotor 3 radially inside the stator 10. Thus, the motor 1 is manufactured.

According to the present example embodiment, the method of manufacturing the coil 30 includes the coil molding step S2 of forming the coil 30 by pressing the wound body 130 using the dies M1 to MF surrounding the wound body 130 and compressively deforming the wound body 130. Therefore, it is possible to change the contour of the coil 30 while changing the cross-sectional shape of the coil wire 135 in accordance with the shape formed by each of the dies M1 to MF. Thus, the cross-sectional shape of the coil wire 135 can be suitably molded into a trapezoidal shape corresponding to the position where the coil wire 135 is wound around the winding core Wm. Accordingly, it is possible to reduce the formation of a gap between the coil wires 135, and to suitably increase the space factor of the coil 30.

Furthermore, for example, when a coil is manufactured by using a coil wire having a cross-sectional shape preliminarily changed to a trapezoidal shape in accordance with a position where the coil wire is wound, the coil wires are easily displaced from each other as the number of layers of the coil increases. Thus, the space factor is less likely to be sufficiently increased. That is, the larger the number of layers of the coil, the more usefully the effect of increasing the space factor can be obtained. In the present example embodiment, on the other hand, the coil 30 is formed by winding the coil wire 35 in three or more layers. Thus, the number of layers of the coil 30 is relatively large, and the effect of suitably increasing the space factor can be more usefully obtained.

Furthermore, for example, when the contour of the wound body 130 in the predetermined cross section CS is to be molded from the rectangular shape PSW into the fan shape PSF in one molding step using the die MF, the wound body 130 in the molding step has an increased amount of deformation. Thus, the arrangement of the coil wire portions 135p aligned in the wound body 130 is likely to be disturbed. In this case, amounts of deformation of the coil wire portions 135p vary and the wound body 130 may be less likely to be molded into a desired shape. Furthermore, the gap between the coil wire portions 135p is likely to be large, and the space factor of the coil 30 cannot be sufficiently increased in some cases. Furthermore, the coil wire portions 135p may rub against each other, and the enamel coatings on the coil wire portions 135p may be damaged.

According to the present example embodiment, on the other hand, the coil molding step S2 of forming the coil 30 includes the intermediate molding steps Sm and the final molding step Sf. Thus, the contour of the wound body 130 in the predetermined cross section CS is not molded from the rectangular shape PSW into the fan shape PSF at one time, but can be molded into the intermediate shape between the rectangular shape PSW and the fan shape PSF, and then into the fan shape PSF. This can reduce each amount of deformation when the wound body 130 is deformed using each of the dies M1 to MF, and can reduce the disruption in the arrangement of the coil wire portions 135$p$. Accordingly, the wound body 130 can be suitably molded into a desired shape, and the space factor of the coil 30 can be more suitably increased. Furthermore, it is possible to reduce rubbing between the coil wire portions 135$p$, and damage to the enamel coatings on the coil wire portions 135$p$.

Furthermore, for example, the larger the number of layers of the coil 30 to be manufactured, the more easily the arrangement of the coil wire portions 135$p$ is disturbed when the contours of the wound body 130 in the predetermined cross section CS are deformed into the fan shape PSF at one time. Thus, the larger the number of layers of the coil 30, the more usefully the effect of reducing the disruption in the arrangement of the coil wire portions 135$p$ can be obtained. In the present example embodiment, on the other hand, the coil 30 is formed by winding the coil wire 35 in three or more layers. Thus, the number of layers of the coil 30 is relatively large, and the effect of reducing the disruption in the arrangement of the coil wire portions 135$p$ can be more usefully obtained.

Furthermore, according to the present example embodiment, the plurality of intermediate molding step Sm are provided, and each contour of the wound body 130 in the predetermined cross section CS becomes similar to the fan shape PSF each time each intermediate molding step Sm is performed. Therefore, it is possible to make the contour of the wound body 130 gradually similar to the fan shape PSF, and further reduce each amount of deformation when the wound body 130 is deformed using each of the dies M1 to MF. Thus, it is possible to further reduce the disruption in the arrangement of the coil wire portions 135$p$.

Furthermore, according to the present example embodiment, the areas of the contours of the wound body 130 in the predetermined cross section CS become smaller each time each intermediate molding step Sm is performed. Therefore, the wound body 130 can be gradually compressed. Here, even when the wound body 130 is compressively deformed, a cross-sectional area of each coil wire portion 135$p$ does not change. Therefore, when the wound body 130 is compressively deformed, the cross-sectional shapes of the coil wire portions 135$p$ change to occupy the gap between the coil wire portions 135$p$. Thus, the cross-sectional shapes of the coil wire portions 135$p$ can be each suitably deformed into a trapezoidal shape, and the same time, the gap between the coil wire portions 135$p$ can be reduced.

Furthermore, for example, when the wound body 130 is formed by winding the coil wire 135 having a circular cross-sectional shape in multiple layers around the winding core Wm without any change, the wound coil wire portions are easily displaced from each other, and it may be difficult for the coil wire portions to be aligned in the up-down direction and the width direction in the manner as illustrated in FIG. 9.

According to the present example embodiment, on the other hand, in the wound body 130 forming step S1, the winding step Sw and the pressing step Sp are alternately performed to form the wound body 130. Therefore, after the cross-sectional shapes of the coil wire portions 135$p$ constituting the wound layer are each changed to a rectangular shape, the coil wire 135 can be wound around an outside of the wound layer to form the next layer. Thus, the position of the coil wire 135 wound around an outside of each layer is less likely to shift as compared with the case where the coil wire portions 135$p$ constituting each layer each have the circular cross-sectional shape. Accordingly, it is possible to easily form the wound body 130 having the coil wire portions 135$p$ aligned in the up-down direction and the width direction.

The present disclosure is not limited to the above-described example embodiment, and may adopt other methods. The number of times of the intermediate molding steps Sm is not particularly limited, and may be once or eight times or more. The intermediate shape between the rectangular shape PSW and the fan shape PSF is not particularly limited as long as the intermediate shape is more similar to the fan shape PSF than the rectangular shape PSW. For example, in FIG. 13, the intermediate shape between the rectangular shape PSWa and the fan shape PSFa may have any shape as long as the intermediate shape is a shape obtained by connecting the one side LS on the one widthwise side in the state of superposition, any point between the upper corner portion P1 and the upper corner portion P3 in both the up-down direction and width direction, and any point between the lower corner portion P2 and the lower corner portion P4 in both the up-down direction and width direction. In the above-described example embodiment, the intermediate shapes PS1$a$ to PS7$a$ and PS1$b$ to PS7$b$ are each the fan shape, but may be other suitable shapes without limitation.

In the wound body forming step S1, the wound body may be formed by winding a coil wire having a rectangular cross-sectional shape in multiple layers around the winding core Wm. In this case, for example, the coil wire having a circular cross-sectional shape is preliminarily deformed into a rectangular shape in a cross section. According to this method, the wound body can be formed without the pressing step Sp. Thus, man-hours in the wound body forming step S1 can be reduced. The coil may be formed by winding the coil wire in two to five layers, both inclusive, or in seven or more layers.

The coil manufactured according to the above-described example embodiment may be used in any motor. The motor including the coil of the above-described example embodiment is installed in, for example, a vehicle, an unmanned moving body, an electric power-assisted device, a robot device, or the like. Note that, the configurations described herein may be appropriately combined as long as there is no contradiction among the configurations.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A method of manufacturing a coil included in a motor, the method comprising:
   (a) forming a wound body by winding a coil wire in multiple layers around a winding core extending in one direction; and
   (b) forming a coil by pressing the wound body using a die surrounding the wound body and compressively deforming the wound body; wherein
   the wound body formed has a contour of a rectangular or substantially rectangular shape in a predetermined cross section that is parallel or substantially parallel with the one direction and passes a center line of the winding core, and includes a plurality of coil wire portions located in the predetermined cross section of the coil wire, the plurality of coil wire portions being aligned along each side of the rectangular or substantially rectangular shape;

the coil has a contour of a fan shape or approximate fan shape in the predetermined cross section, where the coil wire portions are aligned in a direction along an arc and a radial direction of the fan shape or approximate fan shape;

in (b), the coil wire portions in the predetermined cross section are deformed such that cross-sectional shapes each become a trapezoidal or substantially trapezoidal shape; and (b) includes:
  (c) molding the contour of the wound body in the predetermined cross section into an intermediate shape between the rectangular or substantially rectangular shape and the fan shape or approximate shape; and
  (d) molding the contour of the wound body in the predetermined cross section from the intermediate shape into the fan shape or approximate fan shape.

2. The method of manufacturing a coil according to claim 1, wherein
(c) is performed a plurality of times; and
the contour of the wound body in the predetermined cross section gets closer to the fan shape or approximate fan shape each time (c) is performed.

3. The method of manufacturing a coil according to claim 2, wherein the contour of the wound body in the predetermined cross section has an area that becomes smaller each time (c) is performed.

4. The method of manufacturing a coil according to claim 1, wherein
(a) includes forming the wound body by alternately performing:
  (e) winding the coil wire in a single layer around the winding core, the coil wire having a circular cross-sectional shape; and
  (f) pressing the coil wire, which has been wound in the single layer, in a direction of pressing the coil wire against the winding core, and changing the cross-sectional shape of the coil wire, which has been wound in the single layer, in the predetermined cross section to a rectangular or substantially rectangular shape that is elongated in the one direction.

5. The method of manufacturing a coil according to claim 1,
wherein (a) includes forming the wound body by winding the coil wire in multiple layers around the winding core, the coil wire having a rectangular or substantially rectangular cross-sectional shape.

6. The method of manufacturing a coil according to claim 1,
wherein the coil is formed by winding the coil wire in three or more layers.

7. A method of manufacturing a motor, the method comprising the method of manufacturing a coil according to claim 1.

* * * * *